United States Patent [19]

Gütlich et al.

[11] 4,283,467

[45] Aug. 11, 1981

[54] ELECTRIC STORAGE BATTERY WITH GAS DRIVEN ELECTROLYTE MOVEMENT

[75] Inventors: Karl-Friedrich Gütlich, Frankfurt; Wolfgang Kappus, Viernheim; Herbert Zweigardt, Kelkheim; Rudolf Eckardt, Steinbach, all of Fed. Rep. of Germany

[73] Assignee: Varta Batterie Aktiengesellschaft, Hanover, Fed. Rep. of Germany

[21] Appl. No.: 125,464

[22] Filed: Feb. 28, 1980

[30] Foreign Application Priority Data

Mar. 29, 1979 [DE] Fed. Rep. of Germany ....... 2912527

[51] Int. Cl.³ .............................................. H01M 2/38
[52] U.S. Cl. ........................................ 429/51; 429/72; 429/81
[58] Field of Search ................... 429/51, 72, 81, 120, 429/67, 14, 39

[56] References Cited

U.S. PATENT DOCUMENTS

| | | | |
|---|---|---|---|
| 2,584,117 | 2/1952 | Elrod, Jr. | 429/51 |
| 2,932,681 | 4/1960 | Solomon | 429/67 |
| 3,083,253 | 3/1963 | Sundberg | 429/51 |
| 3,290,176 | 12/1966 | Berju et al. | 429/67 |
| 4,074,021 | 2/1978 | Aronson | 429/51 |

*Primary Examiner*—Anthony Skapars
*Attorney, Agent, or Firm*—Weiser, Stapler & Spivak

[57] ABSTRACT

In an electric storage battery having plate electrodes, the capacity and useful life is improved through uniform distribution of concentration and temperature of the electrolyte by means of electrolyte circulation. A synthetic plastic plate positioned between the plate electrodes and the housing wall of the storage battery contains a plurality of vertically extending transport tubes which are open at their upper and lower ends. The bottom portions of the transport tubes, which are immersed in the electrolyte, are connected to compressed air ducts. The compressed air is mixed with the electrolyte present in the transport tube in such a manner that the electrolyte-air mixture present therein is lifted, due to its lower specific gravity, by the electrolyte which surrounds the transport tube. The electrolyte leaving the transport tube produces continuous circulation within the storage battery, and this ensures permanent exchange of the electrolyte present between the plate electrodes.

6 Claims, 4 Drawing Figures

ELECTRIC STORAGE BATTERY WITH GAS DRIVEN ELECTROLYTE MOVEMENT

The invention relates to an electric storage battery with gas driven electrolyte flow between the electrode plates which are united into a plate block, in accordance with the principles of the bubble pump.

In order to achieve the highest possible capacity and long useful life for storage batteries, the concentration and temperature of the electrolyte within the cells should be as uniform as possible. This is accomplished, for example, by circulating the electrolyte by means of rising gas bubbles. In such arrangements there exists a gas/electrolyte mixture in a riser pipe which is surrounded by electrolyte. Due to the lower specific gravity of the gas/electrolyte mixture, this is lifted by the hydrostatic pressure of the surrounding liquid. As a result there occurs circulation of the electrolyte. The gas bubbles are produced, either inside the storage battery, or by a supply of compressed gas.

From U.S. Pat. No. 2,584,117, there is known an electrolyte circulation system having a riser pipe whose lower end extends to near the bottom of the housing and whose upper end extends above the electrolyte surface. Below the electrolyte surface, the riser pipe is provided with an opening which is connected to a compressed air duct. This compressed air duct is connected to a blower by a valve. During air supply, the electrolyte, which is above the outlet opening, has lower density than the electrolyte which surrounds the riser pipe. Due to this pressure difference, the electrolyte within the riser pipe flows upwardly from the bottom of the cell and is returned at the upper end of the riser pipe to the surface of the electrolyte. This produces circulation around the electrode. This results in a relatively uniform density distribution of the electrolyte.

However, there is the drawback of needing a special space for the riser pipe between the electrodes and the housing wall. Retrofitting of cells which have already been manufactured is therefore not possible. Moreover, in such arrangements there may occur circulatory flow of the electrolyte immediately between the riser pipe and the plate block or the housing wall. Also, if a single riser pipe is used, it is relatively difficult to obtain adequately electrolyte mixing within a short enough period of time.

Accordingly, it is an object of the invention to achieve uniform electrolyte mixing over the entire electrolyte volume of the cell within a relatively short period of time. In addition, the electrolyte circulating pump should be capable of being retrofitted.

These and other objects which will appear are accomplished by positioning, on a base plate of non-conducting material, at least two transport pipes extending parallel to each other and having gas supply ducts connected to them, the base plate being insertable between the plate block and the housing wall.

In a preferred embodiment, the upper outlet openings of the riser pipes are located on the side facing toward the plate block, below the minimum height of the electrolyte level. The top edge of the base plate is above the outlet openings. The base plate preferably consists of two synthetic plastic sheets of equal height and width, the transport pipes and gas ducts being formed by bulges in the plastic sheets.

For further details reference is made to the accompanying drawings wherein:

FIG. 1a is a side elevation of an embodiment of the invention;

FIG. 1b is a cross-sectional view taken at 1b—1b in FIG. 1a;

FIG. 1c is a side elevation taken from the opposite side from which FIG. 1a is viewed.

Figure 1:
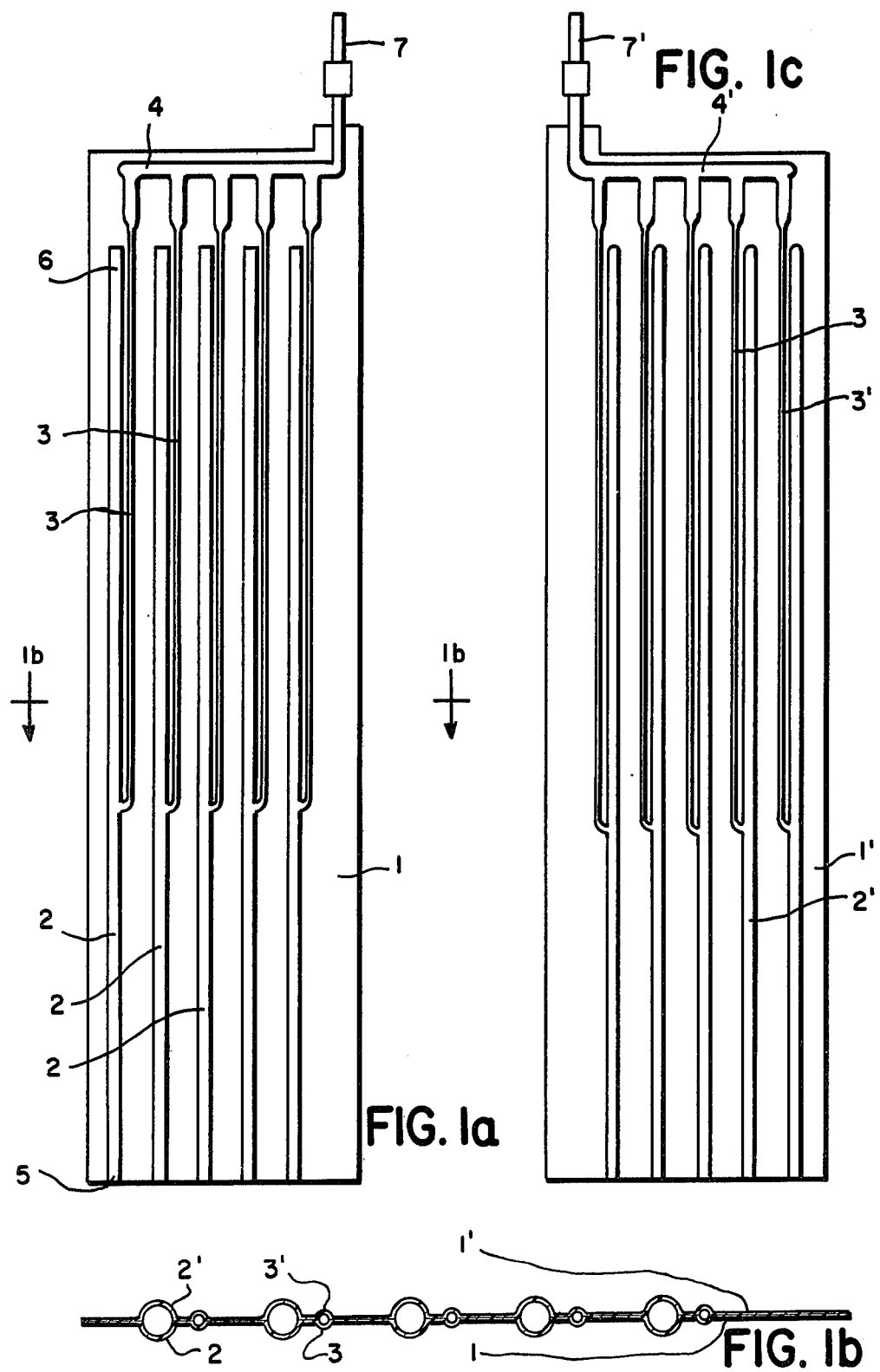

Referring to FIG. 1a, the base plate 1 is provided with five vertically extending transport pipes 2, as well as with the accompanying gas supply ducts 3. The connections of the gas supply ducts 3 to the riser pipes are in the lower half of base plate 1. The riser pipes 2 extend from the lower edge of the base plate 1 to a height which lies below the minimum electrolyte surface level. They are provided with apertures at their lower ends 5, as well as at their upper ends 6.

FIG. 1b shows a cross-section along line 1b—1b. As appears in FIG. 1b, the base plate consists of two synthetic plastic sheets 1,1′, which exhibit mirror image recesses, and which are so connected to each other that the recesses 2, 2′ and 3, 3′ create pipes of nearly circular or elliptical cross-section.

Sheet 1 is pierced at the upper end 6 of the transport pipes 2, whereas, as shown in FIG. 1c, sheet 1′ does not have such openings. The gas supply ducts 3, 3′ are connected to a compressed gas source positioned outside the cell through a comb-like distributor 4, 4′ as well as connectors 7, 7′. The recesses in foil 1′, insofar as they correspond in their function to those of foil 1, are designated with the same reference numerals with the addition of the prime symbol.

Figure 2:
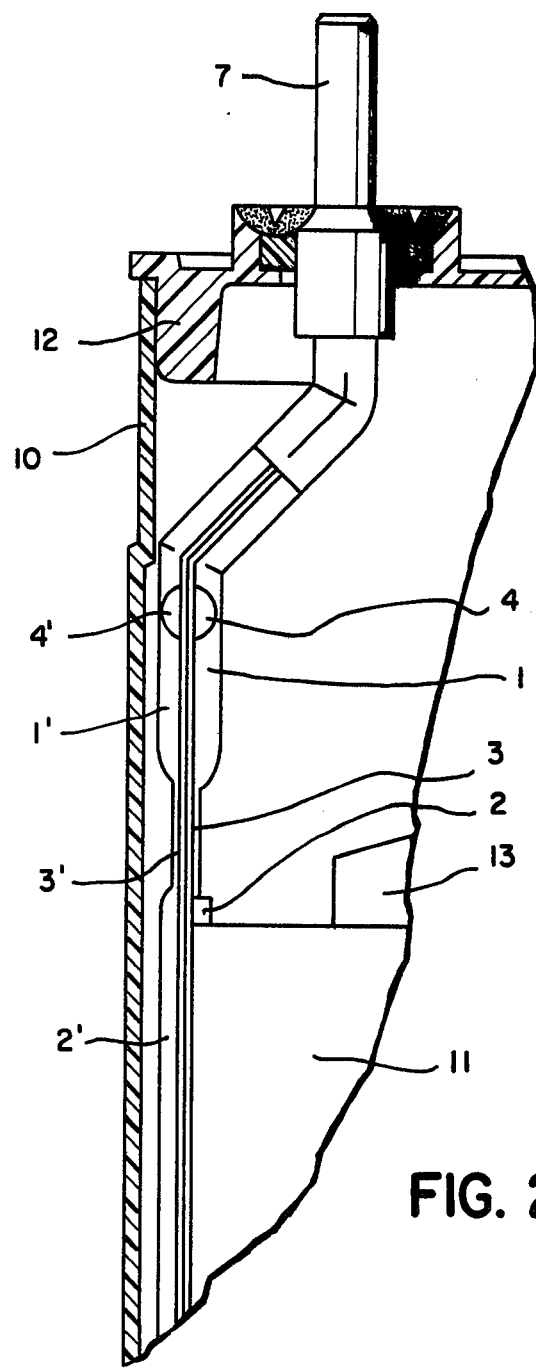
FIG. 2 is an edge-on view showing the structure of FIGS. 1a through 1c installed within the battery housing.

FIG. 2 shows in cross-section the use of a device embodying the invention in the storage battery. The figure shows a portion of the storage battery in cross-section. The base plate composed of plastic sheets 1, 1′ is positioned between the housing wall 10 and the electrode plates 11. It is directly adjacent to the plate block, and, in so doing, completely covers one side of the block. The transport pipes are preferably introduced on the narrow side of the cell container, so that the perpendicular to the base plate extends parallel to the surface of the electrode plates 11.

The bulge defining transport pipe 2′ within plastic sheet 1′ is closed at its upper end, whereas sheet 1 facing the plate block is open at the upper portion of the transport tube 2. In addition, in this cross section, there can be observed gas supply pipe 3, 3′ and the comb-like distributor 4, 4′. The negative electrode plates 11 are connected to each other via take-off lugs 13. The pipe leadthrough occurs through cell lid 12.

It is also possible to provide a flexible hose, instead of the connector 7 which leads directly through the cell lid. This hose can then be passed through the cell lid at any desired location.

By providing five transport pipes, having a length of 340 mm and a diameter of 3 mm, inside the lead storage battery, there is eliminated an acid layering ranging from 1.7 liter of $H_2SO_4$ of density 1.28 g/ml in the lower region of the cell, to 3.4 liters of $H_2SO_4$ of density 1.15 g/ml in the upper region, within five to fifteen minutes. These values apply for an air flow of 2 to 7 liters/min per cell at standard room temperature and atmospheric pressure.

Weldable or bondable plastic are suitable materials for such circulating pumps. Particularly suitable are polystyrene, polypropylene, polyethylene and PVC.

The two base plates are preferably made by deep drawing. However, it is also possible to injection mold the base plates in plastic forms. It is also possible to manufacture the circulating pump by blow molding.

By means of the electrolyte circulation, it is possible to achieve substantial improvement in cooling within the storage battery embodying the invention, because the heat which evolves between the electrode plates is conducted to the walls of the cell vessel by the electrolyte circulation and, thereby, surrendered to the ambient. Furthermore, particularly in cyclic use, there is observed a desirable increased capacity during the useful life, compared with similar storage batteries without electrolyte circulation. In addition, the load factor can be reduced to such a degree that a range of 1.02 to 1.1 can be achieved.

The use of a storage battery embodying the invention has been found to be particularly desirable in the field of electric traction.

We claim:

1. An electric storage battery with gas driven electrolyte flow between the electrode plates united into a plate block in accordance with the bubble pump principle, comprising
    at least two parallel extending transport pipes located on a base plate of non-conducting material,
    the transport pipes having gas supply ducts connected thereto,
    the base plate being adapted to be inserted between the plate block and the housing wall,
    the upper outlet apertures of the transport pipes lying below the minimum height of the electrolyte level on the side facing the plate block, and
    the upper edge of the base plate being above the outlet openings.

2. The battery of claim 1 wherein
    the base plate consists of at least two synthetic plastic sheets of substantially equal heights and widths, and
    the transport pipes and gas supply ducts are formed by bulges in at least one of the plastic sheets.

3. The battery of claim 1 wherein
    the base plate is immediately adjacent the plate block.

4. The battery of claim 3 wherein
    the plane of the base plate is perpendicular to the planes of the electrode plates.

5. The battery of claim 4 wherein
    the sides of the transport pipes facing the plate blocks protrude into the spaces between the edges of electrode plates.

6. The battery of claim 1 wherein
    the base plate consists of at least one synthetic plastic sheet of substantially equal height and width, and
    the transport pipes and gas supply ducts are formed by bulges in at least one plastic sheet.

* * * * *